(12) United States Patent  
Williams

(10) Patent No.: US 12,331,437 B2  
(45) Date of Patent: Jun. 17, 2025

(54) THERMAL RUNAWAY MANAGEMENT SYSTEM

(71) Applicant: Graham Williams, Portland, OR (US)

(72) Inventor: Graham Williams, Portland, OR (US)

(73) Assignee: CiloGear, Portland, OR (US)

( * ) Notice: Subject to any disclaimer, the term of this patent is extended or adjusted under 35 U.S.C. 154(b) by 341 days.

(21) Appl. No.: 18/069,811

(22) Filed: Dec. 21, 2022

(65) Prior Publication Data

US 2023/0203719 A1  Jun. 29, 2023

Related U.S. Application Data

(60) Provisional application No. 63/292,220, filed on Dec. 21, 2021.

(51) Int. Cl.
*D03D 1/04* (2006.01)
*A45F 5/00* (2006.01)
(Continued)

(52) U.S. Cl.
CPC .......... *D03D 1/04* (2013.01); *A45F 5/00* (2013.01); *B32B 3/04* (2013.01); *B32B 5/024* (2013.01); *B32B 5/263* (2021.05); *B32B 7/027* (2019.01); *D03D 15/283* (2021.01); *D03D 15/46* (2021.01); *D03D 15/573* (2021.01); *H01M 10/0525* (2013.01); *H01M 10/623* (2015.04); *A45F 5/1508* (2025.01); *B32B 2262/0253* (2013.01); *B32B 2307/302* (2013.01); *B32B 2307/304* (2013.01); *B32B 2307/308* (2013.01);
(Continued)

(58) Field of Classification Search
CPC ........ D03D 1/04; D03D 15/283; D03D 15/46; D03D 15/573; H01M 2220/30; H01M 10/0525; H01M 10/623; A45C 3/001; A45F 5/00; A45F 5/1508; B32B 3/04; B32B 5/024; B32B 5/263; B32B 7/027; B32B 2262/0253; B32B 2307/302; B32B 2307/304; B32B 2307/308; B32B 2307/54; B32B 2307/732; B32B 2457/10; B32B 5/18; B32B 2266/126; B32B 2307/31; B32B 2307/7376; B32B 2439/02; B32B 5/245; D10B 2321/0211
USPC ........................................................ 428/36.1
See application file for complete search history.

(56) References Cited

U.S. PATENT DOCUMENTS

2013/0202844 A1 * 8/2013 Tam .................. D02G 3/44  
    156/181  
2018/0162626 A1 * 6/2018 Munie ............... A45C 13/26  
2020/0363163 A1 * 11/2020 Lyons ............... F41H 1/00

* cited by examiner

*Primary Examiner* — Matthew D Matzek  
(74) *Attorney, Agent, or Firm* — Chernoff, Vilhauer, McClung & Stenzel LLP

(57) ABSTRACT

A pouch for a radio includes an elongate woven thermoplastic composite material that includes a multi-layer construction with an outer layer having a melting point at a lower temperature than a core material sandwiched therein. The elongate woven thermoplastic composite material has different axial and transverse thermal conductivities in excess of a ratio of 100 and arranged in a manner with multiple layers of the elongate woven thermoplastic composite material. A first additional layer positioned between at least two of the multiple layers of the elongate woven thermoplastic composite material and a second additional insulative layer positioned between at least two of the multiple layers of the elongate woven thermoplastic composite material. The elongate woven thermoplastic composite material at least partially enclosed within a UHMWPE fabric material.

12 Claims, 12 Drawing Sheets

(51) Int. Cl.
  *B32B 3/04* (2006.01)
  *B32B 5/02* (2006.01)
  *B32B 5/26* (2006.01)
  *B32B 7/027* (2019.01)
  *D03D 15/283* (2021.01)
  *D03D 15/46* (2021.01)
  *D03D 15/573* (2021.01)
  *H01M 10/0525* (2010.01)
  *H01M 10/623* (2014.01)

(52) U.S. Cl.
  CPC ..... *B32B 2307/54* (2013.01); *B32B 2307/732* (2013.01); *B32B 2457/10* (2013.01); *D10B 2321/0211* (2013.01); *H01M 2220/30* (2013.01)

THERMAL RUNAWAY MANAGEMENT SYSTEM

CROSS REFERENCE TO RELATED APPLICATIONS

This application claims benefit of U.S. Provisional Patent Application No. 63/292,220 filed Dec. 21, 2021.

BACKGROUND

Battery packs can be used as structural elements in a machine such as an autonomous surface drone used for surveying. These battery packs may require protection from galvanic effects and impact resistance. For example, the drone may be in a hurricane, exposed to trees flying through the air and into the drone. Or the drone may be a military drone and require ballistic protection from adversaries. If all it takes to defeat the drone is to impact one battery cell to initiate thermal runaway, protecting the battery pack from adverse impacts is logical. Further, in the case of maritime vehicle or drone, having a thermal management system that is neutrally buoyant or even positively buoyant is preferred. Such a system providing impact resistance, protection from extreme UV, galvanic isolation from the sea and positive buoyancy would be desirable.

The subject matter of this application relates to systems and methods to inhibit overheating of electrical equipment, inclusive of charging and discharging of batteries.

Portable power sources are used in, for example, military applications, law enforcement applications, aviation applications, automotive applications, maritime applications, personal mobility applications, energy storage applications, wilderness and personal survival applications, hiking and camping applications, sporting and recreation applications, hunting applications, land surveying and expedition applications, autonomous vehicle applications and disaster relief efforts. For example, portable battery packs exist for carrying in a backpack or for wearing on the body. These battery packs, however, can be heavy and inconvenient to access and connect to devices requiring electrical power. Moreover, non-portable power sources are used in, for example, battery-based power stations, home battery-based power backup, and battery-based universal power supplies. Batteries may hold energy generated by, for example, wind or solar farms for discharge to the power grid when the wind is not blowing, or the sun is not shining.

Furthermore, portable battery packs are increasingly required to provide power to one or more electronic devices. The peripheral electronic devices are often connected to a power distribution and data hub, which supplies power to the plurality of peripheral electronic devices and transfers data between the peripheral electronic devices.

Referring to FIG. 1, in the case of military portable radio units, which operate at relatively high power (e.g., 3.2 watts to 20 watts for handheld portable radios) and a relatively high frequency with powerful computing systems that often include encryption, GPS, etc., in addition to radio and data communication, a pouch constructed of a flexible material such as fabric is used to at least partially enclose the battery portion of the portable radio units. The pouch is preferably constructed from a nylon together with some stretchable material for compliance. Alternatively, the radio can be attached with a plastic or metal holder. The radio-frequency portion of the respective portable radio unit is typically detachably engageable to the battery portion of the portable radio unit. The battery portion of the military portable radio unit typically includes a rechargeable lithium-ion battery. Non-rechargeable lithium-ion and other rechargeable and/or non-rechargeable batteries may also be used. By way of example, the military portable radio unit may be an AN/PRC-161 or an AN/PRC-163. Unfortunately, the military portable radio unit tends to get excessively hot as a result of extended use even to the point of turning itself off to avoid damage. Military radios additionally may be used with removable devices called mission modules that provide a particular additional feature. These devices may create additional heat, load on the battery and require cooling. If any of these electronic devices are not adequately cooled, they will not work as efficiently, and even may possess programming to reduce their efficacy when they are warm.

These military radios and associated mission modules operate at temperatures far in excess of ambient temperature or human body heat. As such, these geometrically regular radios create thermal signatures easily isolated from the background environment and ambient temperatures.

What is desired, therefore, is a technique that inhibits the military portable radio unit from getting excessively hot and/or generate thermal signature.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
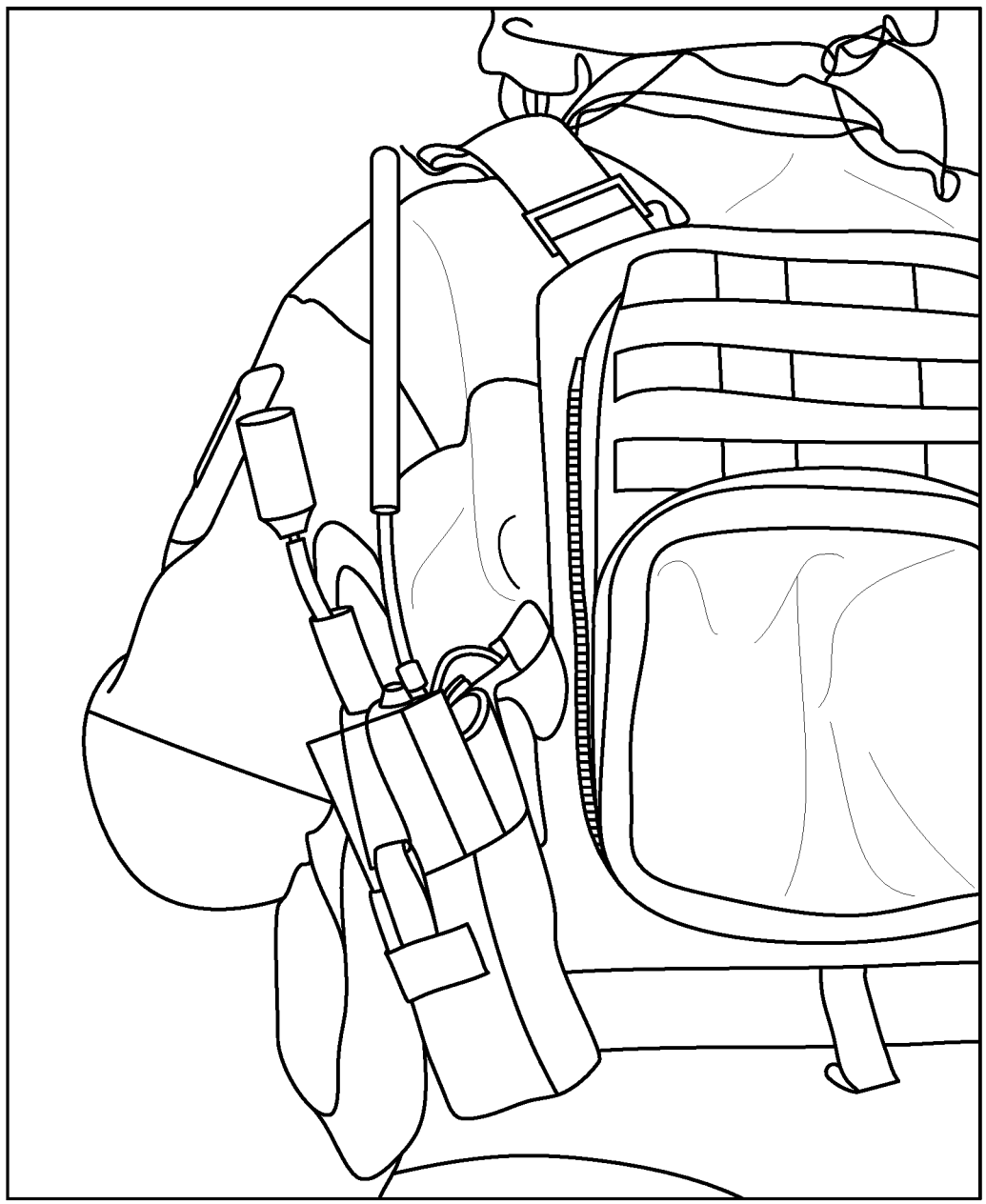
FIG. 1 illustrates a military portable radio unit within a pouch.

During extended use, a temperature sensor included with the military portable radio unit includes associated protection circuitry that turns the radio unit off if it exceeds a threshold temperature. Additionally, batteries may include associated protective circuitry that turns off the battery if it exceeds a threshold temperature. By turning the portable radio unit off, the portable radio unit is allowed to cool off. Thereafter, the portable radio unit may be turned back on to effectuate radio frequency communications. Unfortunately, the radio unit cannot be used to make calls during the time that the radio unit is turned off, which is problematic during an active engagement between military forces. Moreover, if the temperature of the lithium-ion battery becomes too hot (e.g., 130-180 or greater degrees Fahrenheit) then the likelihood of thermal runaway tends to substantially increase. Additionally, lithium-ion batteries provide less power for a shorter period in hot operational use and also functionally degrade faster in hot operational use. Capacity and duty cycle are both adversely effected at temperatures as low as 110 degrees Fahrenheit. This aging of the battery takes place whether the temperatures are sustained or intermittent. For example, a degradation rate of maximum possible charge after 250 charges may increase from 4.22% to 13.24% at 55 degrees C. aka 132 degrees F. The difference between 113 and 132 degrees can be described as catastrophic for the battery's life and the aging effect. Keeping the average temperature below 95 degrees could half the aging effect. A vulnerability for lithium-ion batteries is rapid heating, i.e., going from ambient or a lower temperature to anything above 113 degrees Fahrenheit, which is the type of activity and heating seen in the use of military radios.

The use of batteries in general, and in particular lithium-ion batteries, include a particular safety concern generally due to the phenomenon called thermal runaway. Thermal runaway is an uncontainable exothermic reaction that can occur inside a lithium-ion battery when it is damaged, short circuited, or otherwise overheated. Lithium-ion batteries have their cathode and anode separated by an extremely thin polyethylene barrier. If this polyethylene barrier is damaged, a short circuit occurs, which results in the materials inside the cell decomposing. These decomposition reactions are exothermic, which is why the battery temperature quickly rises to the melting point of the metallic lithium, causing a violent self-heating chain reaction. The rate of decomposition is exponentially proportional to the rate of exothermic self-heating. This creates a self-feeding loop that rapidly increases the decomposition rate, and consequently, the self-heating rate goes up until the cell heats up faster than it can release heat to the environment. The cell eventually becomes unstable and releases its potential energy to the environment. This process is called thermal runaway. During thermal runaway, the battery heats up to over 600° C. in a matter of seconds or even milliseconds. This results in the electrolytes inside the cells disintegrating into simpler, more flammable molecules, such as methane, ethane, and hydrogen gas. The cathode also starts to decompose and release oxygen. These gases result in pressure and temperature build-up inside the battery, and eventually, an explosion.

Whether in storage, or more often in operation by charging and/or discharging, temperature is the most significant factor in the aging effects of lifespan and charge capacity of lithium-ion and other types of batteries.

Precise cooling can help to prevent thermal runaway, delivering safety to an ever-growing market. Thermal management applied to battery packs can either be active or passive. Active thermal management uses fans and pumps to force cooling from forced air and/or liquid to absorb heat from (li-ion) battery packs especially as seen in all-electric and hybrid-electric vehicles. Passive thermal management absorbs and dissipates heat solely through passive convection, conduction, and radiation. Passive thermal management is functional, generally until a point of saturation. This usually results in a cooling system that is less mechanically complex and less expensive than active cooling approaches, although potentially less powerful at a particular moment. While such active thermal management methods may be useful in particular environments, they tend to be unsuitable for a military portable radio unit where compactness is a paramount concern and carrying additional power sources for active thermal management is problematic.

By way of example, a lithium-ion battery is typically composed of multiple lithium-ion cells that are connected in an arrangement that includes parallel and/or serial interconnections. The result of the configuration determines the amp-hours and voltage output for the lithium-ion battery. By way of example, if the lithium-ion battery includes 7 lithium-ion cells, and each lithium-ion cell has a 10 percent chance of thermal runaway at 150° F., then there is an overall high percentage chance that at least one of the lithium-ion cells will encounter thermal runaway. In this manner, it may be observed that even with a relatively low number of lithium-ion cells, there is a significant chance that thermal runaway will occur. With increased temperatures, the likelihood of thermal runaway at any particular moment also increases. Further, the likelihood of thermal runaway increases if the battery is not charged in a suitable manner.

Figure 2:
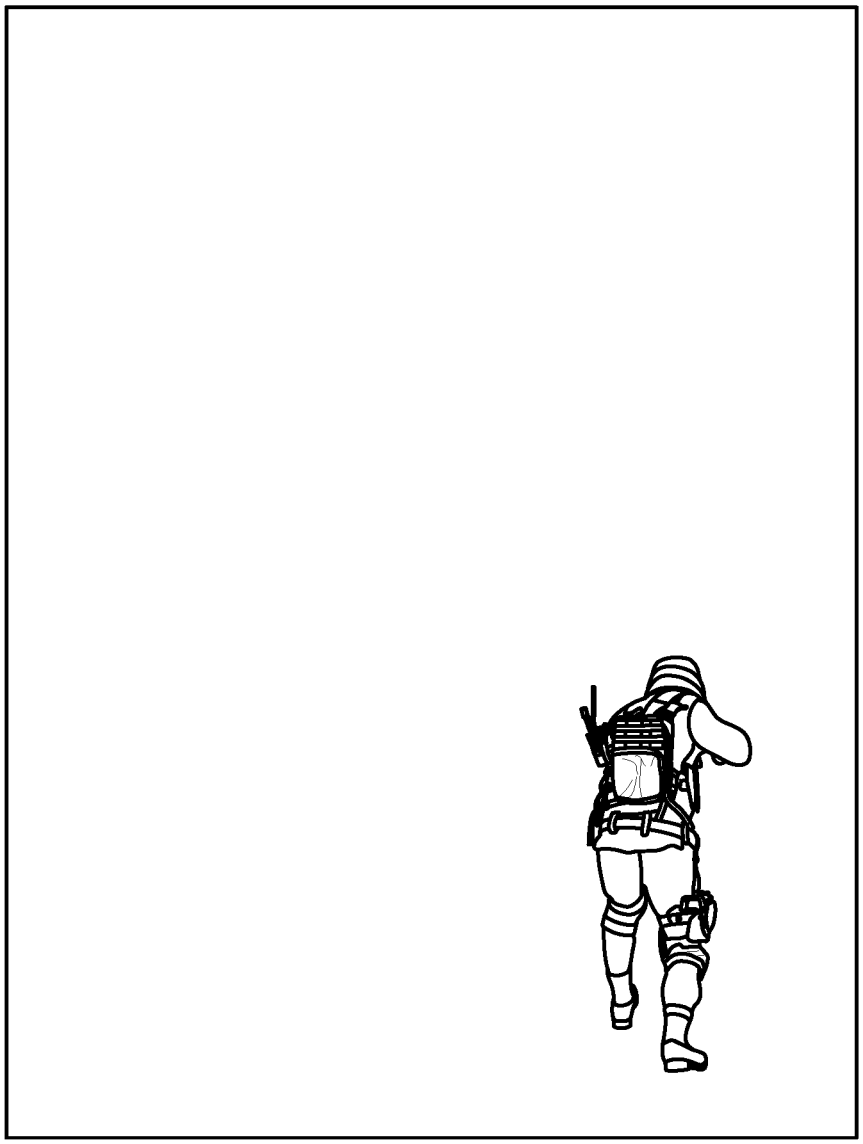
FIG. 2 illustrates a person with a thermally visible battery.

Referring to FIG. 2, for military operations that are based upon stealth, such as a military sniper, a lot of effort is extended to reduce their overall signature. The use of particular clothing tends to reduce the person's signature across multiple spectra from visible to long-wave infrared or thermal. However, military radio and associated lithium-ion battery(ies) tend(s) to become relatively hot during use or otherwise while merely turned on, resulting in a substantial thermal signature that is difficult to obscure. Without a sufficient reduction in the thermal signature of the lithium-ion battery, the person or even the equipment is relatively easy to target, especially with a drone having a thermal imaging sensor. The thermal signature of the lithium-ion battery may be reduced by use of one or more of several techniques, such as, for example, a metal mesh fabric (limited impact on thermal imaging), a portable cooling device (relatively heavy and impactable for a mobile device), a phase-change material (heavy and only maintains temperature for a limited duration) or other coatings.

The traditional approach to heat management for a lithium-ion battery is based upon adapting active thermal management strategies for computer chips, which rely on substantial air movement, to a passive environment. For example, this could involve placing a cold material with fins, which acts as a heat sink, against the lithium-ion battery to cool it through the thermal conductivity of the material. Thermal conduction may be defined by $q=-k\nabla T$ where q is the heat flux, k is the thermal conductivity, and $\nabla T$ is the temperature gradient. The thermal conductivity relates to the ability of a material to transfer thermal energy away from a hot surface, and if this transfer is effected at sufficient speed, then the lithium-ion battery would have a greater propensity to maintain an operational temperature range. However, even with the heat sink placed in direct contact with the lithium-ion battery, the continued heat generation due to charging and discharging cycles will raise the temperature of the heat sink. After a period of time, unless the heat sink has an unlimited ability to absorb or transfer heat from the system, the lithium-ion battery will heat up to an excessive degree. The poor performance of this traditional approach, an aluminium or copper mass with fins that cannot maintain a high temperature gradient, arises because it considers only the thermal-conduction contribution to heat transfer and neglects key additional variables.

The use of lithium-ion batteries tends to be in a temporally irregular manner, such that they are used intensively for some periods of time and not at all for other periods. Such irregular use of a lithium-ion battery tends to reduce its life, change its thermal signature, and change its thermal runaway characteristics. In some cases, excessive heat from the lithium-ion cells may result in difficulty using the portable radio unit in a handheld manner. Further, if the existing portable radio unit is intended to be used for 24 hours, including a sufficiently capable passive or active cooling device tends to result in an excessively heavy and bulky overall package.

The irregular use pattern of lithium-ion batteries on rapid discharge is contrasted with slow discharge or steady recharge in other periods of time. Battery Management Systems are widely used to ameliorate the problems associated with such unpredictable changes in discharge rate and intensity but have the disadvantage of limiting overall peak power in periods where high performance is required.

In many cases, the lithium-ion battery is trickle-charged using an auxiliary battery source for extended use during operations. The trickle-charging using the auxiliary battery source, while beneficial to increase the extended use of the battery source, tends to increase the likelihood of thermal runaway, an increase in battery derogation, and may compromise the electronics associated with the lithium-ion battery by modification of the energy resources.

A passive thermal management technique is desirable to reduce the complexities associated with trickle-charging the lithium-ion battery and to preclude the complexities associated with an active thermal management system. The passive thermal management technique is preferably relatively compact, preferably delivers long-lasting performance, and is preferably resistant to foul weather and immersion, risks which may exist with a portable radio unit. Preferably, the relatively compact thermal management system is less than ½ an inch thick. The passive thermal management technique is preferably resistant to body weight or greater compression, impact, shock-loading, and other adverse environmental impacts. The relatively compact durable thermal management system is electrically insulative.

Rather than a passive thermal management technique based upon an inappropriate paradigm, it is desirable to formulate an approach that has its foundation in explicit and implicit variables associated with the heat flux (also heat flux density or heat flow density or heat flow rate intensity). Heat flux is a flow of energy per unit area per unit of time, which includes a direction, a magnitude, and a time scale. Heat flux includes both thermal conductivity and thermal capacity. High thermal conductivity allows large amounts of heat to be transferred. High thermal capacity allows large amounts of heat to be absorbed, and hence stored prior to transfer, without a large increase in temperature. The combination of high thermal conductivity and high thermal capacity in a structured material presents a range of design options to realize and control a temperature gradient that is effective in managing the heat flow generated by a lithium-ion battery and associated systems. This approach is based upon the premise of a continuing heat flux, generated by the use pattern of the device incorporating the lithium-ion battery, which is transferred away from the device. Attempts to merely insulate the lithium-ion battery using a material with high thermal capacity will retain the heat, ultimately exacerbating the issues after a sufficiently long period of use. The passive thermal management structure is therefore based preferably upon a dynamic approach to the heat flux that takes advantage of the time required for heat to be transferred along an extended path. The structured material realizing this aim should house a long path of high thermal conductivity that, combined with a high capacity for heat absorption along this path, allows controlled heat dissipation at the end of the path.

Heat flux depends on the 'thickness,' or amount of material available for thermal transfer, as well as on the thermal diffusivity of the material, A. $A=k/\rho^* c_p$ where k is the thermal conductivity (W/(m·K)),
$c_p$ is the specific heat capacity (J/(kg·K)),
$\rho$ is the density (kg/m$^3$), such that $\rho^* c_p$ is the total heat capacity. Diffusivity is therefore ratio of thermal conduction to thermal absorption and therefore can be understood as a rate at which heat is transferred from the hot to the cold end of a material. By way of example, water has a thermal diffusivity of 0.143 mm$^2$/s while copper has a thermal diffusivity of 117. Copper will immediately saturate a temperature gradient and then will continue heating the cold end. Water will become warm in immediate proximity to the heat source, despite its high heat capacity, but due to its low thermal conductivity will not transfer the heat across the available 'thickness.'

By way of example, the passive thermal management structure may include a long copper-coated tape material that is affixed to and wrapped around the lithium-ion battery. In this example, the 'thickness' for heat flux (thermal energy transfer) is defined by the length of the tape. The copper-coated tape structure conducts heat rapidly along the length of the tape but cannot create a substantial temperature gradient (loss of temperature along its length) during heat transfer. Alternatively, an aluminium heat sink with fins may be used, but similarly does not tend to dissipate a substantial amount of heat along its surfaces without external airflow. Rather than a material with high thermal conductivity but an insubstantial thermal capacity, it is desirable to use a material with a relatively high conductivity and a high thermal capacity, leading to a low diffusivity that creates an efficient temperature gradient along the path length.

A preferred material includes a lightweight woven thermoplastic composite material, generally unaffected by compression, moisture or impact (ballistic impacts), resistant to galvanic processes and corrosion, with minimal thickness that is not electrically conductive and is self-healing. It should have structural rigidity or flexibility depending on the application. The material would preferably be capable of stopping the penetration of bullet or other projectile, such as debris from a road or hurricane. Tape yarns or hybrid tape and fiber constructions can be used in other types of construction, including crystal extrusions or heterogenous tapes, fiber and tradition yarns. By way of example, some composite materials may include self-reinforced composites and/or polymers may use other types of construction, including, for example, crystal extrusions, and traditional thread. The woven thermoplastic composite material preferably includes a multi-layer construction, with an outer layer preferably having a melting point at a lower temperature than a core material sandwiched therein. The multiple layers of the fabric are stacked together and heat and pressure are applied to form a substantially rigid, impact resistant material. For example, a homogenous glue may be coated on a fiber or tape, then the fiber or tape is woven together, and then the layers of the fabric are composited through heat and pressure. Some types of the material, for example, may be constructed from a tape with a tensile modulus of 10 GPa or more, a shrinkage at 130 degrees C. of 6% or less, a sealing temperature of 120 degrees C. or more, and/or a denier of 100 or more. A single layer of the fabric preferably has a thickness of less than 1.0 mm. In general, self-reinforced polymeric materials (e.g., self-reinforced composite fabric) may be used, which may include one or more components, with the spatial alignment of the reinforcing phase in the matrix being 1D, 2D, or 3D.

By way of example, the woven thermoplastic composite material may start out with a series of ultra-high molecular weight polyethylene (UHMWPE) filaments or fiber yarns before being woven into fabric (or PBO, PIPD, or PBT materials). These yarns are then woven into a tight series of at least 20 yarns per inch. These yarns can range from 100 denier to 1800 denier, dependent on the amount of power and the amount of cooling required. Fabric can be woven with yarn in one axis and UHMWPE tape in the other axis. Other materials, such as basalt, fiberglass, or aramid fibres can be added to act as thermal insulators where desired. UHMWPE is generally Ultra-high-molecular-weight polyethylene.

By way of example, a thermoplastic composite material may have a fabric weight of 3.1 oz/yd. The fabric may be woven from a 375 d UHMWPE material. It may be 8.0 mils thick, with 32 yarns per inch in warp and fill, with a breaking strength of 400 lbs. It could be, for example, a 400 d UHMWPE with 3.8 oz/yd at 9 mils thick and 35 yarns per inch in warp and fill with a breaking strength of 800 lbs. Also, composite materials together with UHMWPE (e.g., 2 to 8 million amu) may be used. By way of example, the UHMWPE powder grade GUR 4120 (molecular weight of approximately $5.0 \times 10^6$ g/mol) may be used to produce an isotropic part of the multilayered sample. The powder, by way of example, may be heated up to 180° C. at a pressure of 25 MPa in a stainless-steel mold to produce 80×10×2 mm$^3$ rectangular samples, with fibers having an average diameter of 15 µm (e.g., 10-20 µm) and a linear density of 220 Dtex (e.g., 150-300 Dtex). By way of example, a 100 to 1800 denier filament or yarn may be used, as desired.

UHMWPE and/or HMWPE has substantially different axial and transverse thermal conductivities. The axial thermal conductivity of UHMWPE is generally between 20 W/mK to 200 W/mK in the long direction, depending on preparation, while the same materials have generally 0.04 to 0.2 W/mK transverse thermal conductivity. Through hot stretching, it is possible to sinter a woven thermoplastic UHMWPE material to create defined areas of greater thermal conductivity. Different denier of material, i.e., materials with different thicknesses on the different axes (warp/weft) of a woven fabric may be used to enhance or direct thermal conductivity. Heterogenous materials can be added to the 'short axis' to improve or degrade thermal conductivity in specific locations. Due to the engineered difference in directional thermal conductivity, it may be helpful to consider the fabric as capable of thermal wicking: after the area of the fabric in contact with the operating device is saturated with heat, this heat spreads along individual fibers to create a dynamic temperature gradient. The measured diffusivity of an exemplary UHMWPE fabric has an axial thermal diffusivity of A=0.25 mm$^2$/s, i.e., close to that of water, but with both the thermal conductivity and the heat capacity being much higher.

Fiber can be added repeatedly to create objects of suitable size for an application. Incorporating regions of higher and lower thermal conductivity allows full control of the architecture of any thermal management system. The fibers, such as tape or filament or spun or melt-spun UHMWPE or twisted crystal, are preferably tightly packed, inclusive of folding on themselves to increase thermal conductivity.

The structure of UHMWPE may include relatively weak bonding between olefin molecules that allows local thermal excitations to disrupt the crystalline order of a given chain piece-by-piece, giving it much greater heat conductivity than other high-strength fibres. UMWPE has significantly greater by several orders of magnitude heat conductivity than most yarns or polymers. Further, the structure of UHMWPE includes a relatively simple structure of the molecule that gives rise to surface and chemical properties. The UHMWPE does not include polar groups and accordingly does not readily absorb water, nor wet easily, resulting in improved water resistance. It is electrically insulative and highly resistant to UV and compression. Accordingly, UHMWPE is generally a flexible material that includes substantial thermal wicking properties that encourages the heat energy from the lithium-ion battery to go into the UHMWPE material. UMHWPE has a sufficient density, which leads to substantial thermal diffusivity. With a sufficiently long length of UHMWPE material thermally and/or physically interconnected with the lithium-ion battery, it tends to act to wick away a substantial amount of heat from the lithium-ion battery while also dissipating a substantial amount of heat from the lithium-ion battery. It is noted that UHMWPE material often comes in the form of powder, crystalline, crystalline film, gel spun fiber, melt spun fiber, woven fabric, or laminates constructed from a variety of UHMWPE materials.

Figure 3:
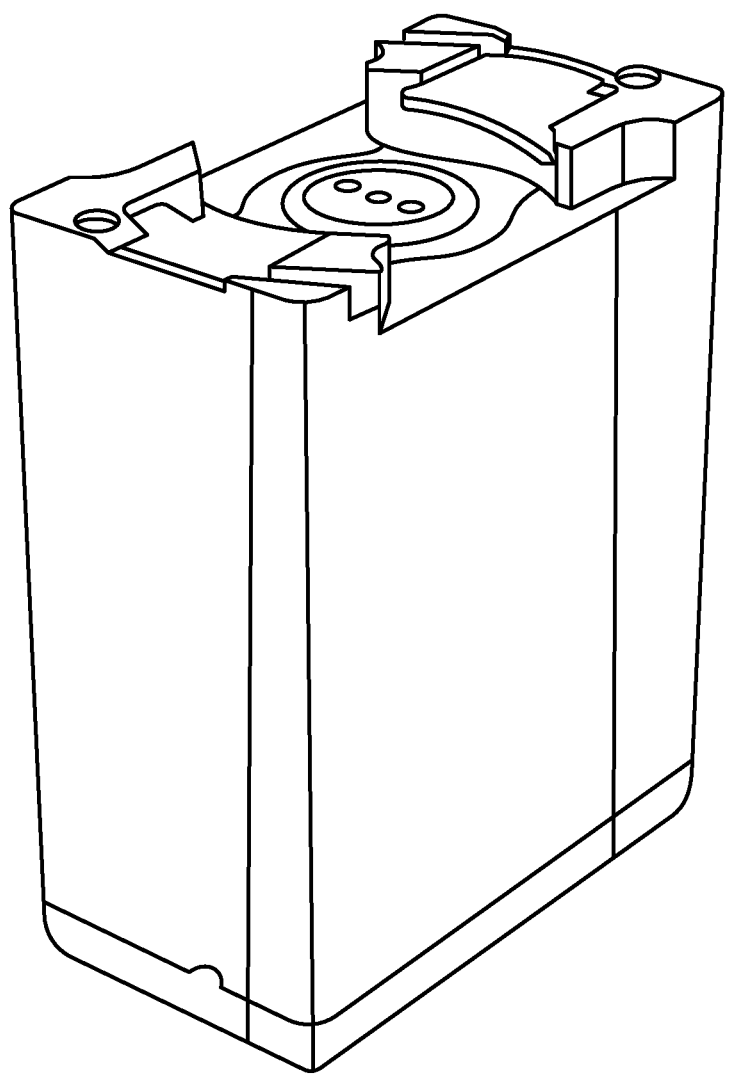
FIG. 3 illustrates a lithium-ion based battery for a portable radio.

Referring to FIG. 3 an exemplary lithium-ion battery for a military radio unit is illustrated.

Figure 4:
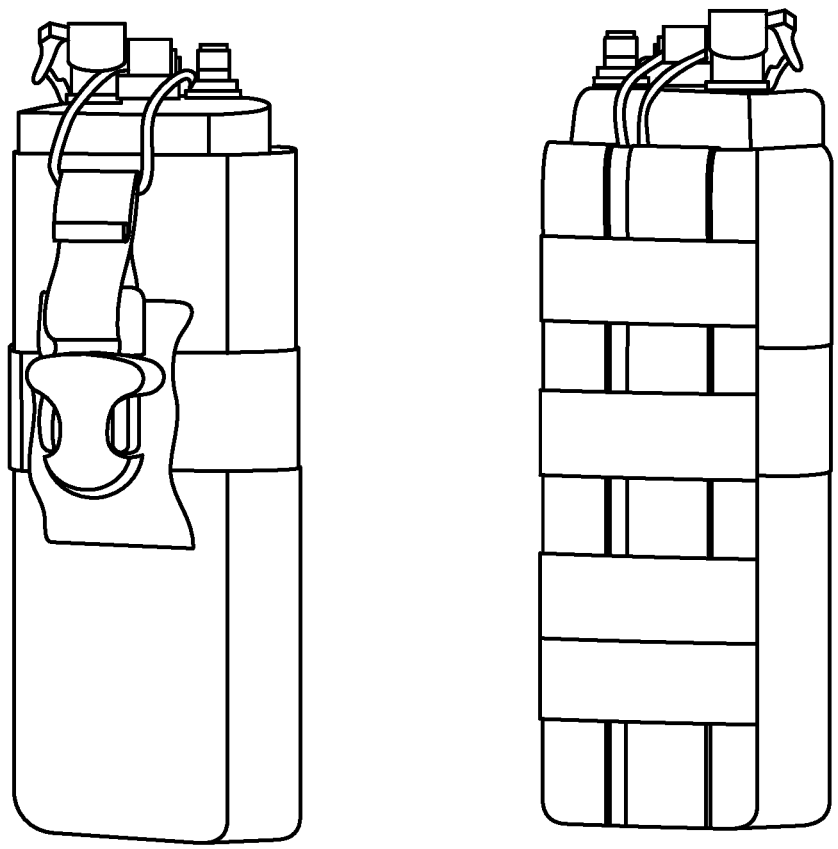
FIG. 4 illustrates a pouch for a lithium-ion based portable radio.

Referring to FIG. 4, an exemplary pouch for the radio and the lithium-ion battery of FIG. 3 is illustrated.

One type of UMWPE material may be in the form of a self-reinforced polymer or crystalline tape or film made into non-woven scrim or self-reinforced polymer. By way of example, a film may have a thickness of 50-60 um with a linear density (denier) in the range of 750 to 65,000, a breaking tenacity (g/den) between 1.9 and 2.3, a breaking strength (lbs) between 30 and 3,000, a modulus (g/den) between 1,750 and 2,250, and/or an elongation at break percentage between 1.5 and 2.0. By way of example, a film may include various fibers, such as LCP Polyester-Polyarylate, para-aramid, aramid copolymer, HMPE (gel spun), HMPE (solid state) and/or PBO.

Figure 5:
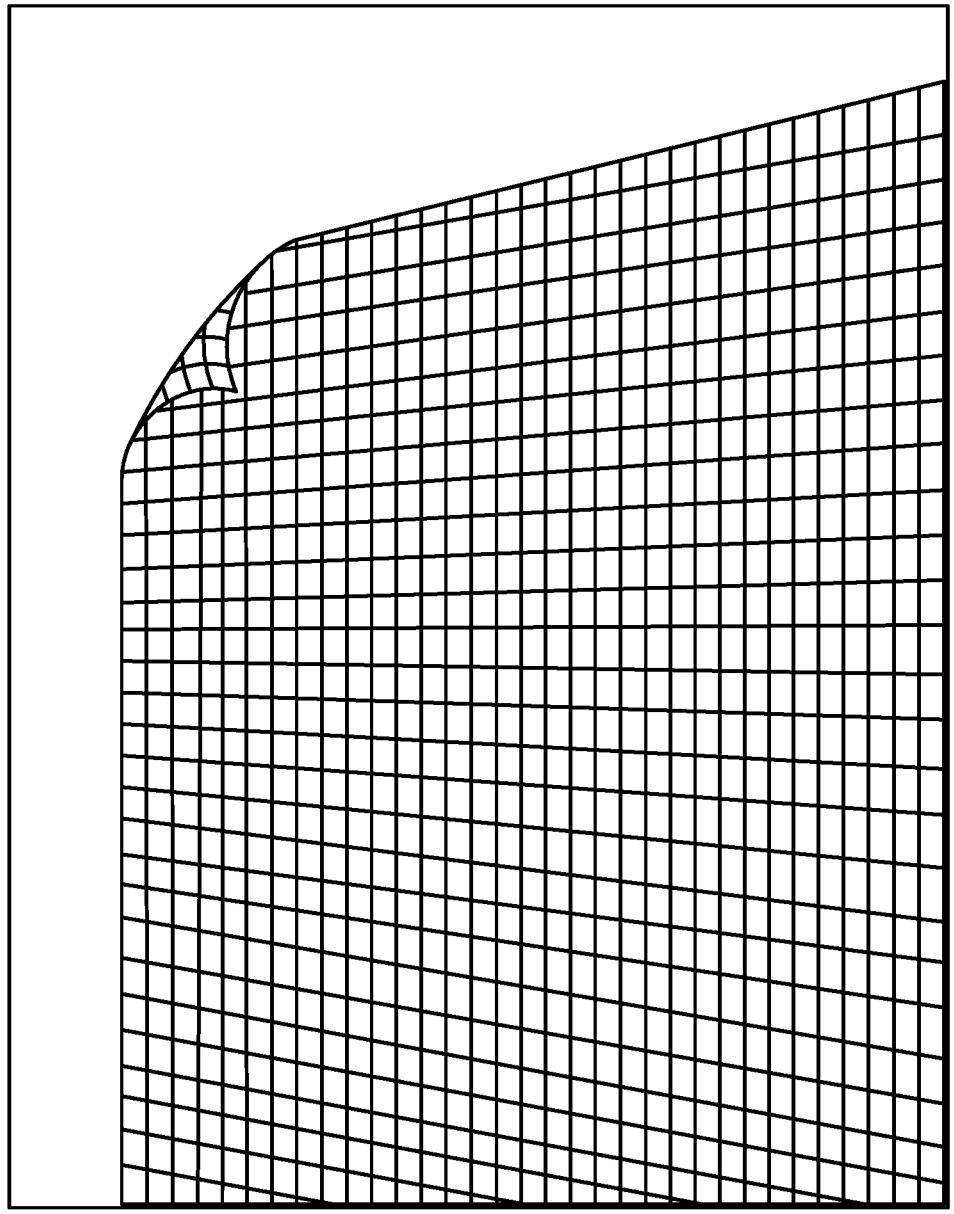
FIG. 5 illustrates a UHMWPE scrim material.

Referring to FIG. 5, one type of UHMWPE material may be in the form of a non-woven scrim made from gel or melt spun fibers, which is a resilient and flexible material. The scrim may include a pattern of thicker directional fibres with a relatively thin layer of material between the thicker directional fibres. The scrim UHMWPE material tends to be flexible, compressible, twistable, and bendable around the lithium-ion battery. Multiple layers of the scrim UHMWPE material may be located in thermal and/or physical interconnection to the lithium-ion battery. While the scrim UHMWPE material provides improved wicking of heat from the lithium-ion battery, it was determined that it has a relatively limited amount of thermal wicking because of the relatively thin strips of UHMWPE material within the scrim.

Figure 6:
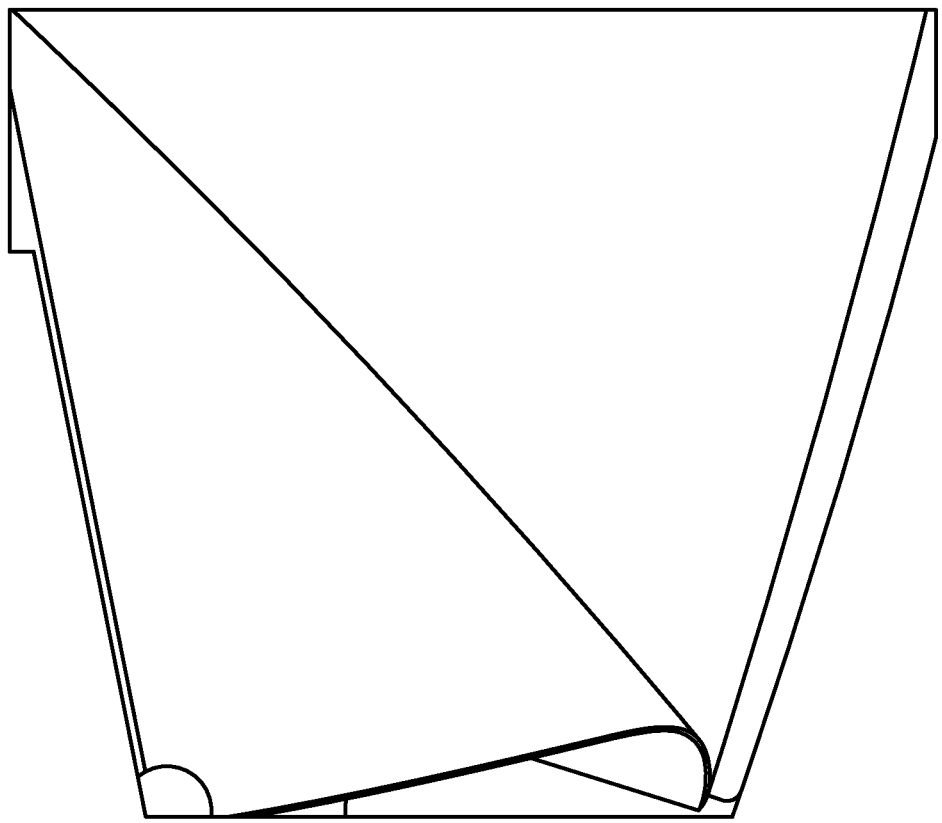
FIG. 6 illustrates a UHMWPE fabric material.

Referring to FIG. 6, a material with greater thermal wicking may be achieved by using a modified UHMWPE fabric that has a larger surface area of material. The material should still be relatively thin and relatively compressible, so that the resulting structure may be arranged into a suitable manner. The UHMWPE material may be folded multiple times upon itself to form a stack of multiple UHMWPE layers. Multiple layers of the UHMWPE fabric may be located in thermal and/or physical interconnection to the lithium-ion battery. It was further determined that the thermal heat loss tends to occur to a substantially greater extent along the direction of the yarn material, rather than in a direction through the multiple layers of yard. Preferably the material is at least 20 by 20 yarns per inch, or greater. For example, material with at least 30 by 30 having a 400 denier or greater is suitable for military radios (e.g., AN/PRC-161 or AN/PRC-163.

Figure 7:
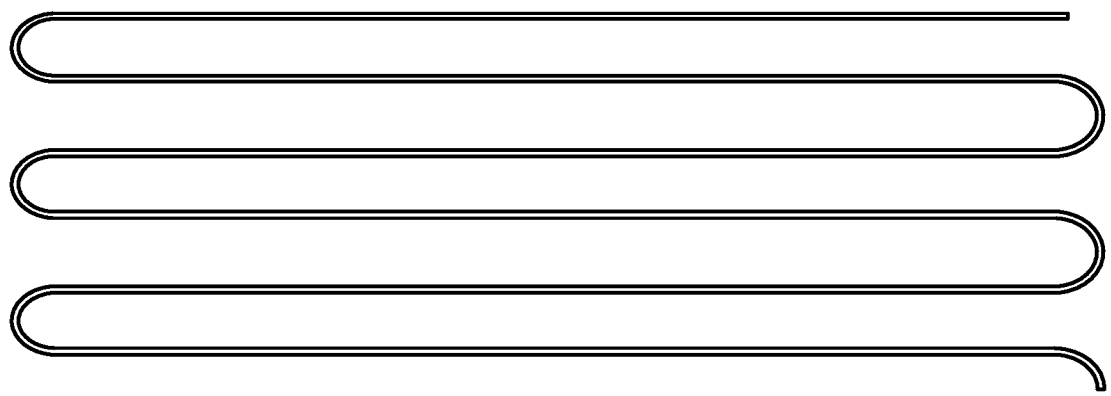
FIG. 7 illustrates a stack of UHMWPE fabric.

Referring to FIG. 7, a stack of fabric that (side view of FIG. 6) has a zig-zag pattern of material dissipates the thermal heat along the length of the material, while at the same time tends to generally get warm over time. Accordingly, the zig-zag pattern tends to improve the thermal wicking characteristics. However, a meaningful amount of conductive heating occurs in a perpendicular direction through the stack of material, thus resulting in a sub-optimal heat dissipation arrangement. This is especially the case when the stack of material is in a compressed form, with each layer in a face-to-face arrangement with the next adjacent layer.

Figure 8:
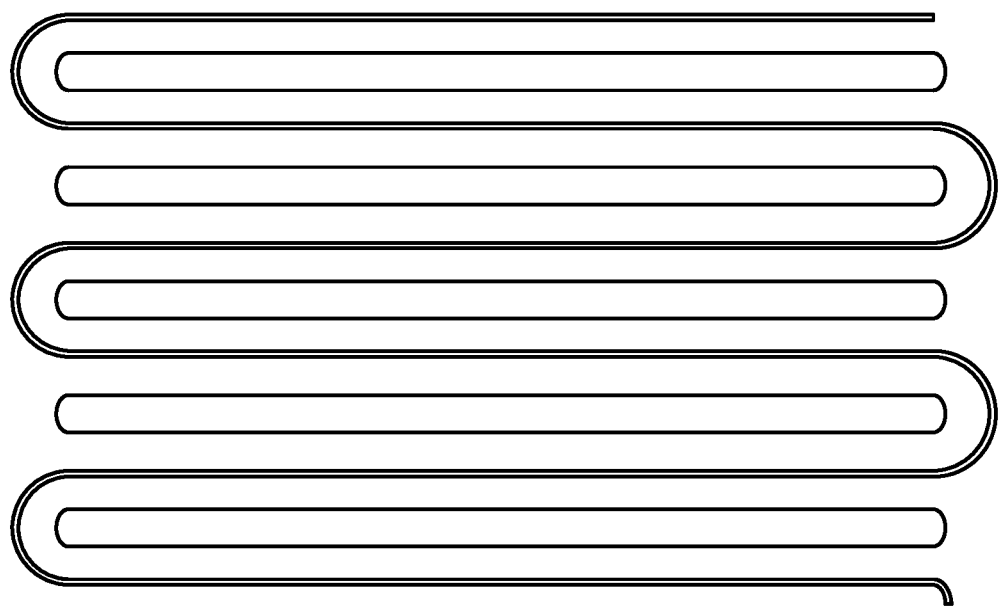
FIG. 8 illustrates a stack of UHMWPE fabric together with other layers.

Referring to FIG. 8, to inhibit the amount of conductive heating that occurs in a perpendicular direction through the stack of material, an additional material may be included between each (or selected ones) of the layers of the stack of material. For example, paper may be included between each of the layers of the stack of material. However, for outdoor environments, the paper tends to be degraded with water. For example, a thermoset adhesive film may be included between each of the layers of the stack of material. However, use of a thermoplastic adhesive proximate the lithium-ion battery tends to re-bond if the temperature is sufficiently high, which improves the lifespan of the system. Other materials may be used, as desired. Preferably thermoplastic adhesives that can self-heal under the high operating temperatures are desired for durability. For some applications, thermoset adhesives with melt temps in excess of operating temperatures may be preferred. The thickness of the adhesive film can be varied based on the amount of insulation required, such as for example, from 0.0005 mm to 0.010 mm, generally. Further, the thickness of the adhesive film may be varied depending on the location within the structure. Furthermore, if the structure includes folds, the thickness of the film may be decreased proximate the folds, so the overall thickness of the films is more uniform that if the films were fully overlapping with one another. Furthermore, if the structure includes folds, the films may be positioned in a discontinuous manner proximate the folds, so the overall thickness of the films is more uniform that if the films were fully overlapping with one another. Ideally, the films would be of a similar specific gravity as the material.

Figure 9:
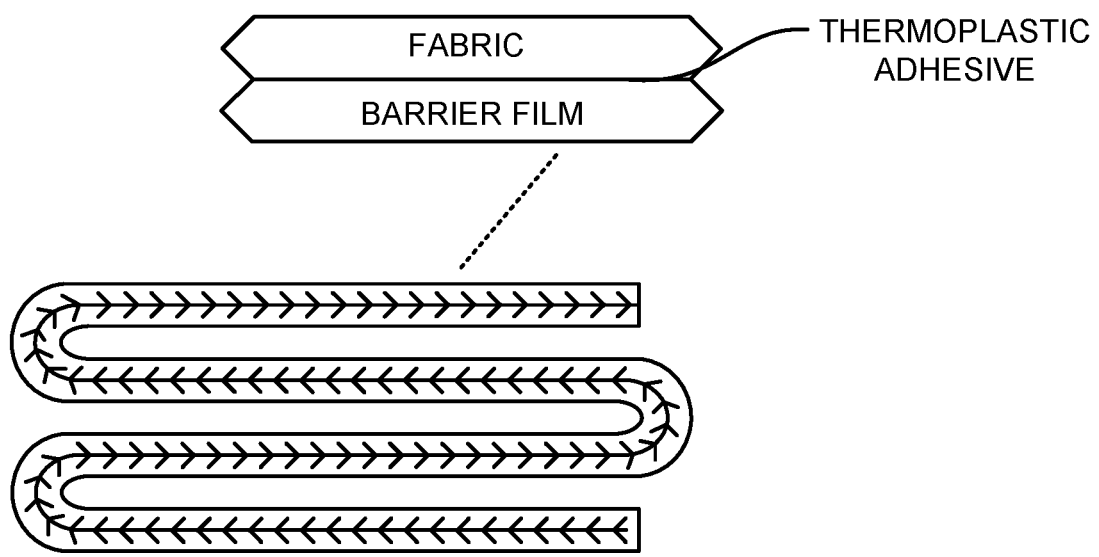
FIG. 9 illustrates a stack of UHMWPE fabric together with a film.

Referring to FIG. 9, to inhibit the amount of conductive heating that occurs in a perpendicular direction through the stack of material, an additional film may be included between each (or selected ones) of the layers of the stack of material. The additional film may be, for example, 0.5 mil to 10 mil in thickness. Also, the film is a readily compressible material and is also a flexible material. In many cases, the greater the surface area for each layer increases the amount of thermal dissipation and the greater the number of layers further increases the amount of thermal dissipation. While an improvement, there remains a meaningful amount of heat transferring in a vertical direction through the material, causing the material to become warm. This additional film can be adhered to an insulative adhesive film, as desired. By way of example, the stack may include a fabric, a thermoplastic adhesive, and a barrier film.

Figure 10:
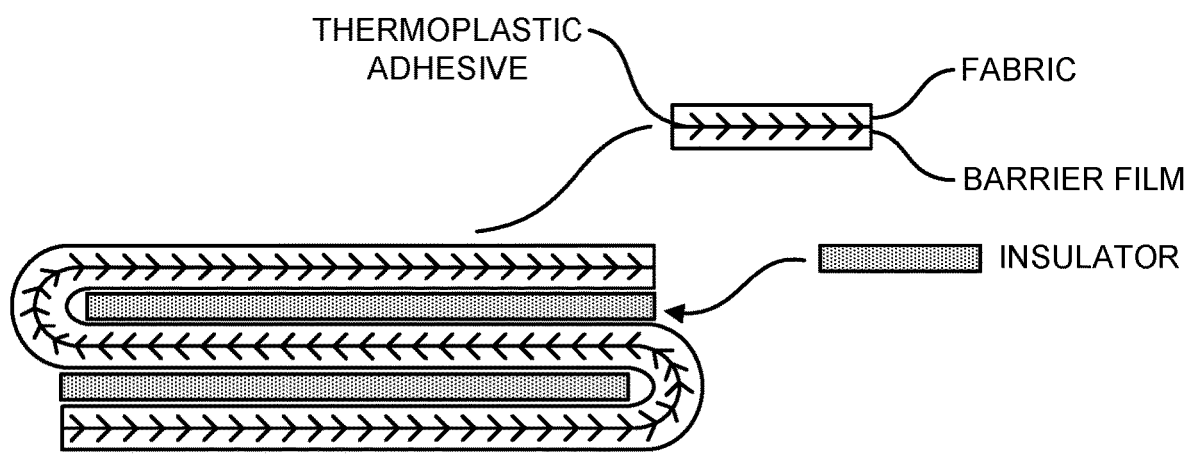
FIG. 10 illustrates a stack of UHMWPE fabric together with insulative layers.

Referring to FIG. 10, to further decrease the heat transferring in a perpendicular direction through the material, it is desirable to include one or more insulative layers in the stack of material. The UHMWPE fabric may be adhered to a backing material, if desired. Between one or more layers of the UHMWPE fabric material an insulative material may be included. The insulative material inhibits the amount of thermal dissipation in a vertical direction. By decreasing the amount of thermal dissipation in a perpendicular direction, the UHMWPE fabric material forms a longer thermal path (i.e., thickness). By way of example, the insulative material may be an aerogel. The insulative material decreases the vertical heat transmission, potentially increases the physical rigidity of the stack of material if desired, and increases the effective thermal length of the material as a result of the thermal conductivity following the zig-zag path of the material which increases its thermal dissipation because the effective thermal length of the material is increased by the insulative material acting to direct the thermal dissipation along the extended length of the material.

Figure 11:
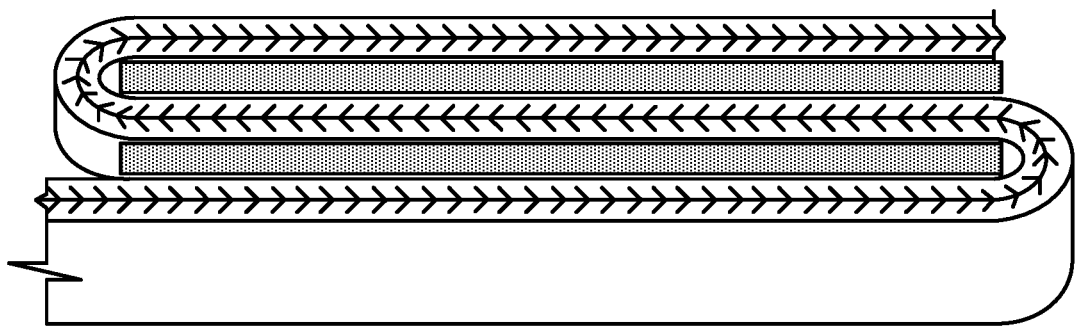
FIG. 11 illustrates a stack of UHMWPE fabric together with insulative layers and a UHMWPE wrap.

Referring to FIG. 11, it is desirable to further encourage the heat flow into a larger path by encasing the stack of material of FIG. 10 with a UHMWPE fabric material. With the stack of material being at least partially enclosed within the UHMWPE fabric material, the central layers act as more efficient heat flow dissipation surfaces, the heat flow has a greater path to flow and therefore the heat dissipation is increased. The outer layer can use a different thickness of adhesive, reducing the insulative capacity and increasing perpendicular thermal transfer. The adhesive layer can be so thin as to create the framework for creating an SRP type material and sintering the outer layer to the inner system. The outer layer can be cut on a 45-degree bias to reduce potential heat transfer and conductivity along the axial lengths of fiber.

Figure 12:
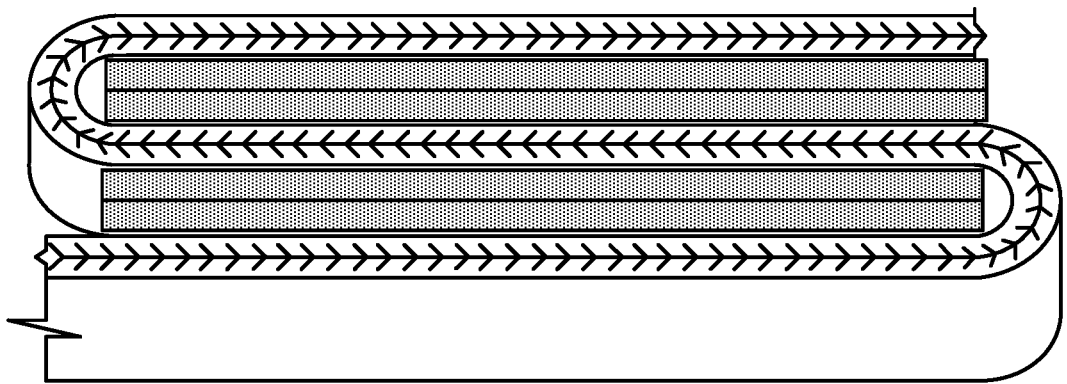
FIG. 12 illustrates a stack of UHMWPE fabric together with insulative layers, a UHMWPE wrap, and a metalized film.

Referring to FIG. 12, to further reduce the heat signature of the lithium-ion battery (e.g., infrared signature), it is desirable to include one or more layers (e.g., a specially prepared film) within the stack of material. Other films may be used with various spectral properties. In this manner, the heat flow maintains its greater path and the measurable or detectable signature is also reduced. Preferably the specially prepared film layer is adhered to the UHMWPE fabric material with an insulating adhesive.

By way of example, the pouch may be constructed from a multi-layer laminate with a face fabric of a colored very high molecular weight PE, a specially prepared from, and one or more layers of UHMWPE fiber in a woven fabric or laid scrim, with one or more additional layers of specially prepared films. This multi-layer laminate may be a flattened structure. Preferably, the aerogel is used as a "tarp" or a "loose coverall" effectively using air as an insulator. Further, a waterproof membrane or an activated carbon membrane may be included, if desired.

By way of example, the UHMWPE material may have a thermal conductivity of 20-200 W/m-K. By way of example, the UHMWPE fabric material have a thermal conductivity of 5-20 W/m-K prior to any sintering. By way of comparison the thermal conductivity of nylon fabric is approximately 0.05 W/M-k or less. By way of example, Aspen Aerogel Pyrothin ATB2000 has a thermal conductivity of approximately 26 mW/M-k at 100 degrees C. which equates to an insulator.

By way of example, the UHMWPE fabric material has a low density and floats on water. By way of example, Aluminium tends to have a thermal conductivity of 237 W/m-K but has a density of approximately 278 percent greater than UHMWPE fabric material, thereby Aluminium has substantially less effective thermal diffusivity per gram less than UHMWPE fabric material. Diffusivity is generally equivalent to the thermal conductivity divided by density times specific heat. This measure tends to be important for applications that require a user to carry the material.

In some embodiment, the pouch that includes the portable radio together with the lithium-ion battery, may include the interior layer, as previously described, of thermal reducing layer to reduce the likelihood of thermal runaway. Also, the thermal reducing layer may be enclosed at least in part by an exterior fabric layer, such as nylon.

The signature across multiple spectrums from visible to long wave infrared or thermal of the previously described materials may likewise be used for other applications. By way of example, a substantially larger piece of material may be used to cover various objects, such as a vehicle. In this manner, the signature of an object may be obscured and less likely to be detected.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

I claim:

1. A pouch for a radio comprising:
    (a) an elongate woven thermoplastic composite material;
    (b) said elongate woven thermoplastic composite material includes a multi-layer construction with an outer layer having a melting point at a lower temperature than a core material sandwiched therein;
    (c) said elongate woven thermoplastic composite material has different axial and transverse thermal conductivities in excess of a ratio of 100;
    (d) said elongate woven thermoplastic composite material arranged in a manner with multiple layers of said elongate woven thermoplastic composite material;
    (e) a first additional layer positioned between at least two of said multiple layers of said elongate woven thermoplastic composite material;
    (f) a second additional insulative layer positioned between at least two of said multiple layers of said elongate woven thermoplastic composite material;
    (g) said elongate woven thermoplastic composite material at least partially enclosed within a UHMWPE fabric material.

2. The pouch for said radio of claim 1, wherein said elongate woven thermoplastic composite material includes a tape yarn.

3. The pouch for said radio of claim 1, wherein said elongate woven thermoplastic composite material includes a hybrid tape and fiber constructions.

4. The pouch for said radio of claim 1, wherein said elongate woven thermoplastic composite material is a self-reinforced composite and/or polymer.

5. The pouch for said radio of claim 1, wherein said elongate woven thermoplastic composite material is in the form of a tape with a tensile modulus of 10 GPa or more.

6. The pouch for said radio of claim 1, wherein said elongate woven thermoplastic composite material is in the form of a tape with a shrinkage at 130 degrees C. of 6% or less.

7. The pouch for said radio of claim 1, wherein said elongate woven thermoplastic composite material is in the form of a tape with a sealing temperature of 120 degrees C. or more.

8. The pouch for said radio of claim 1, wherein said elongate woven thermoplastic composite material is in the form of a tape with a denier of 100 or more.

9. The pouch for said radio of claim 1, wherein said elongate woven thermoplastic composite material is in the form of a tape with a single layer having a thickness of less than 1.0 mm.

10. The pouch for said radio of claim 1, wherein said elongate woven thermoplastic composite material is in the form of a tape with a tensile modulus of 10 GPa or more, a shrinkage at 130 degrees C. of 6% or less, a sealing temperature of 120 degrees C. or more, a denier of 100 or more, and a single layer having a thickness of less than 1.0 mm.

11. The pouch for said radio of claim 1, wherein said elongate woven thermoplastic composite material includes ultra-high molecular weight polyethylene.

12. The pouch for said radio of claim 1, wherein said first additional layer is a film between 0.5 mil to 10 mil in thickness.

* * * * *